United States Patent
Hatanaka et al.

(10) Patent No.: US 7,413,331 B2
(45) Date of Patent: Aug. 19, 2008

(54) LCD WITH MULTI-COLOR OPTICAL UNIT AND CROSS DICHROIC DEVICE

(75) Inventors: Masato Hatanaka, Saitama (JP); Kazuhiro Yokota, Saitama (JP); Haruaki Wada, Chiba (JP); Takashi Oku, Saitama (JP)

(73) Assignee: Sony Corporation, Tokyo (JP)

( * ) Notice: Subject to any disclaimer, the term of this patent is extended or adjusted under 35 U.S.C. 154(b) by 215 days.

(21) Appl. No.: 10/536,511

(22) PCT Filed: Sep. 24, 2004

(86) PCT No.: PCT/JP2004/013917

§ 371 (c)(1),
(2), (4) Date: Jun. 2, 2006

(87) PCT Pub. No.: WO2005/033579

PCT Pub. Date: Apr. 14, 2005

(65) Prior Publication Data

US 2007/0064445 A1   Mar. 22, 2007

(30) Foreign Application Priority Data

Sep. 30, 2003   (JP) .............................. 2003-340810

(51) Int. Cl.
*F21V 7/04* (2006.01)
*F21V 9/00* (2006.01)

(52) U.S. Cl. ................... 362/601; 362/19; 362/231; 362/608; 362/613

(58) Field of Classification Search ............... 362/19, 362/231, 601, 613
See application file for complete search history.

(56) References Cited

U.S. PATENT DOCUMENTS 5,748,828 A * 5/1998 Steiner et al. ............... 385/146
5,805,244 A   9/1998 Suh (Continued)

FOREIGN PATENT DOCUMENTS

JP   05-241103   9/1993

(Continued)

*Primary Examiner*—Sandra O'Shea
*Assistant Examiner*—James W Cranson
(74) *Attorney, Agent, or Firm*—Rockey, Depke & Lyons, LLC; Robert J. Depke

(57) ABSTRACT

The present invention relates to a backlight apparatus and a liquid crystal display apparatus, capable of realizing a backlight apparatus having high color reproductivity without color irregularities in a backlight apparatus having a LED device as its light source. In the optical unit 61, there are disposed the dichroic mirror B which transmits green light Lg and red light Lr and reflects blue light Lb, the dichroic mirror G which transmits the light Lb and the light Lr and reflects the light Lg, and the dichroic mirror R which transmits the light Lb and the light Lg and reflects the light Lr, and they transmit or reflect the light emitted from the LED devices 11B, 11G and 11R to mix to form the white light Lw. The light Lw formed by the dichroic mirrors B, G and R is entered to the light guiding plate 62 by the mirror performing a total reflection. Therefore, in the backlight apparatus having an LED device as its light source, it is possible to realize a backlight apparatus having high color reproductivity, without color irregularities.

5 Claims, 20 Drawing Sheets

U.S. PATENT DOCUMENTS

| | | | | |
|---|---|---|---|---|
| 6,079,841 | A * | 6/2000 | Suzuki | 362/616 |
| 6,181,391 | B1 * | 1/2001 | Okita et al. | 349/65 |
| 6,469,755 | B1 | 10/2002 | Adachi et al. | |
| 6,976,779 | B2 * | 12/2005 | Ohtsuki et al. | 362/608 |
| 7,320,531 | B2 * | 1/2008 | West et al. | 362/231 |
| 2003/0095399 | A1 | 5/2003 | Grenda | |

FOREIGN PATENT DOCUMENTS

| | | |
|---|---|---|
| JP | 08-248353 | 9/1996 |
| JP | 2001-237088 | 8/2001 |
| TW | 459142 | 10/2001 |
| TW | 468059 | 12/2001 |
| WO | WO 02/097324 | 12/2002 |

* cited by examiner

LCD WITH MULTI-COLOR OPTICAL UNIT AND CROSS DICHROIC DEVICE

This application claims priority to Japanese Patent Application Number JP2003-340810, filed Sep. 30, 2003 which is incorporated herein by reference.

TECHNICAL FIELD

The present invention relates to a backlight apparatus for surface emission, having an LED device or the like as its light source, and a liquid crystal display using the backlight apparatus, and more particularly, to a backlight apparatus and a liquid crystal display which are capable of achieving high color reproductivity.

BACKGROUND ART

FIG. 1 shows a configuration example of a liquid crystal display for displaying images, which constitutes a computer terminal, a mobile electronic device or a television receiver.

A liquid crystal display panel 2 is constituted by sealing liquid crystals between two polarizing plates (not shown), and displays images by changing directions of liquid crystal molecules by applying voltage to vary light transmissivity. Since the liquid crystals themselves of the liquid crystal display panel 2 do not emit light, a backlight apparatus 1 performs surface emission from the back side of the liquid crystal display panel 2.

This backlight apparatus 1 is configured with LED devices 11B, 11G and 11R as light sources (hereinafter, they are referred to simply as an LED device 11 when it is unnecessary to individually differentiate between them. They are referred to in a similar way also in other cases), a light guiding plate 12, a diffusion sheet 13, a BEF sheet 14 and a D-BEF seat 15, which are stacked one after the other as shown in the figure and disposed so as to oppose the liquid crystal display panel 2, and performs surface emission toward the liquid crystal display panel 2.

As the light sources of the surface emission, the LED devices 11B, 11G and 11R of the backlight apparatus 1 emit blue light Lb, green light Lg, red light Lr, respectively. As shown in FIG. 2, the blue light Lb, the green light Lg and the red light Lr emitted from the LED device 11 are naturally mixed and becomes white light Lw while being led by the light guiding plate 12.

In the example of FIG. 1, there is provided only one for each of the LED devices 11B, 11G, 11R respectively emitting the blue light Lb, the green light Lg, the red light Lr, for simplicity, however, practically, a plurality of respective LED devices 11B, 11G, 11R are provided in a predetermined ratio.

As shown in FIG. 2, the light guiding plate 12 guides the light entered through a light guide path 12A and a reflection path 12B to the diffusion sheet 13 disposed on the top surface of the light guiding plate 12.

The light guiding path 12A and the reflection path 12B are designed to have a space necessary for naturally mixing the light emitted from the LED devices 11B, 11G and 11R to become the white light Lw. For example, a width W and a diameter R in FIG. 2 are set to predetermined dimensions enough for forming such space. In addition, materials of the light guiding path 12A and the reflection path 12B are predetermined materials so that the light is reflected with a suitable refraction index for performing light guiding or reflection efficiently.

The light guiding plate 12 has a bottom portion on which, for example, dots are formed in order to exit light to each portion of the diffusion sheet 13 as uniformly as possible, so that some of the guided light is reflected by the dots and exited to the diffusion sheet 13 side.

The diffusion sheet 13 is made of, for example, a polycarbonate film of 0.25 mm in thickness, uniforms the light entered from the light guiding plate 12 by diffusing ununiformed part thereof, and transmits the resultant light to the BEF sheet 14.

A BEF (Brightness Enhancement Firm) sheet (brightness improvement sheet for P-component: the BEF series is a product name of Sumitomo 3M company) 14 converges the P-component beyond a viewing angle of the liquid crystal of the liquid crystal display panel 2 (a visible angle for a user, of the light transmitted through the liquid crystal display panel 2) among the P-component of the light entered through the diffusion sheet 13 to within the viewing angle. Since the light (P-component) beyond the viewing angle of the liquid crystal display panel 2, which is invisible for a user even passed through the liquid crystal display panel 2, is to be converged within the viewing angle in this manner, apparent brightness can be improved. It is to be noted that, an S-component of the light entered to the BEF sheet is transmitted to the D-BEF sheet 15 as it is.

The D-BEF sheet (brightness improvement sheet for S-component) 15 converts the S-component of the light entered through the BEF sheet 14 into the P-component and, as similar to the BEF sheet 14, converges the P-component light beyond the viewing angle of the liquid crystal display panel 2, and transmits the converged light to the liquid crystal display panel 2.

The liquid crystal display panel 2 (FIG. 1) is originally configured to transmit only the P-component by the polarizing plate. In response to a signal from a not shown signal line, the liquid crystal display panel 2 controls directions of the liquid crystals by each pixel unit and varies the transmission amount of the white light Lw which is formed by the light generated from the LED device 11 and entered via the light guiding plate 12, the diffusion sheet 13, the BEF sheet 14 and the D-BEF sheet 15 to form and display images.

It is to be noted that, in addition to the example of FIG. 1, an example of a backlight apparatus having an LED device as a light source which naturally mixes blue light, red light and green light emitted from the LED device is disclosed in Utility Model Publication No. Hei 7-36347 and JP-T 2002540458.

[Patent Document 1] Utility Model Publication No. 7-36347, JP-T 2002540458.

DISCLOSURE OF THE INVENTION

However, as shown in FIG. 1, when the light from the LED device 11 is naturally mixed, there entered, for example, BR (magenta), RG (yellow), BG (cyan), and further, a mixed color light of them in the obtained light other than the primary color light of the blue light Lb, the red light Lr, and the green light, so that there is a problem of occurring color irregularities. It is to be noted that primary color filters of a blue (B), a red (R) and a green (G) are disposed on the liquid crystal display panel 2.

The present invention is made in view of such circumstances, and to improve high color reproductivity, for example, in the backlight apparatus having an LED device as its light source, without color irregularities.

A backlight apparatus described in claim 1 is an apparatus that uses a relay dichroic mirror for color mixing of BGR primary color. The present invention has at least an optical unit including a first light source (B) for emitting a first primary color light (for example, B, hereinafter it is referred to in a similar manner), a second light source (G) for emitting a second primary color light (for example, G), a third light source (R) for emitting a third primary color light (for example, R), a first mirror surface body for reflecting the first primary color light (B) and/or transmitting other primary color light, a second mirror surface body for reflecting the second primary color light (G) and/or transmitting other primary color light, a third mirror surface body for reflecting the third primary color light (R) and/or transmitting other primary color light; and color mixing means that mixes each of the color light transmitted through the first, second and third mirror surface bodies and emits white light.

A backlight apparatus described in claim 2 is an apparatus that uses a cross dichroic mirror for color mixing of BGR primary color. The backlight apparatus of the present invention has at least an optical unit including a first light source (B) for emitting a first primary color light (B), (a mirror surface body for reflecting the first primary color light (B)), a second light source (G) for emitting a second primary color light (G); a third light source (R) for emitting a third primary color light (R), (a mirror surface body reflecting the third primary color (R)), and a cross dichroic device having a first dichroic film for reflecting the first primary color light (B) and transmitting the second primary color light (G) and a second dichroic film for reflecting the third primary color light (R) and transmitting the second primary color light (G), in an X-shape, for emitting white light by mixing the first, second and third primary color light. It is to be noted that (a mirror surface body for reflecting the first primary color light (B)) and (a mirror surface body reflecting the third primary color (R)) are omitted from claim because they are not essential elements.

A backlight apparatus described in claim 3 is an apparatus that adopts a polarization conversion system for an optical unit to align a polarization direction of emission. The backlight apparatus has at least an optical unit including a light source (W) for emitting white light (W), a first mirror surface body for transmitting a first polarized wave (P) and reflecting a second polarized wave (S), a second mirror surface body for transmitting the second polarized wave (S) reflected by the first mirror surface body, and a polarization converting device (λ/2 phase difference plate) for converting the second polarized wave (S) reflected by the second mirror surface body into the first polarized wave (P); wherein a polarized wave to be emitted is emitted aligned with the first polarized wave (P).

A backlight apparatus described in claim 4 is an apparatus for carrying out a polarization conversion after the color mixture. That is, in the backlight apparatus described in claim 3, the light source (W) is white light obtained by mixing each of primary color light emitted from a first light source (B) for emitting a first primary color light (B), a second light source (G) for emitting a second primary color light (G), and a third light source (R) for emitting a third primary color light (R).

It is to be noted that the color mixture of BGR primary color of the present invention and the polarization conversion can be arbitrarily combined. Namely, the case where after the polarization conversion is carried out for each BGR primarily color by the technique in claim 3, the color mixture is carried out by the techniques in claim 1 and claim 2 is also included in the idea of the present invention.

A liquid crystal display apparatus described in claim 5 has a backlight apparatus having at least an optical unit which includes a first light source (B) for emitting a first primary color light (B), a second light source (G) for emitting a second primary color light (G), a third light source (R) for emitting a third primary color light (R), a first mirror surface body for reflecting the first primary color light (B) and/or transmitting other primary color light, a second mirror surface body for reflecting the second primary color light (G) and/or transmitting other primary color light, a third mirror surface body for reflecting the third primary color light (R) and/or transmitting other primary color light; and color mixing means that mixes each of the color light transmitted through the first, second, third mirror surface bodies and emits white light; and a liquid crystal display panel for displaying an image by using light surface-emitted from the backlight apparatus.

A liquid crystal display apparatus described in claim 6 has a backlight apparatus having at least an optical unit which includes a first light source (B) for emitting a first primary color light (B), a second light source (G) for emitting a second primary color light (G), a third light source (R) for emitting a third primary color light (R), and a cross dichroic device having a first dichroic film for reflecting the first primary color light (B) and transmitting the second primary color light (G) and a second dichroic film for reflecting the third primary color light (R) and transmitting the second primary color light (G), in an X-shape, for emitting white light by mixing the first, second and third primary color light; and a liquid crystal display panel for displaying an image by using light surface-emitted from the backlight apparatus.

A liquid crystal display apparatus described in claim 7 has a backlight apparatus having at least an optical unit which includes a light source (W) for emitting white light (W), a first mirror surface body for transmitting a first polarized wave (P) and reflecting a second polarized wave (S), a second mirror surface body for reflecting the second polarized wave (S) reflected by the first mirror surface body, and a polarization converting device (λ/2 phase difference plate) for converting the second polarized wave (S) reflected by the second mirror surface body into the first polarized wave (P); wherein a polarized wave to be emitted is emitted aligned with the first polarized wave (P); and a liquid crystal display panel for displaying an image by using light surface-emitted from the backlight apparatus.

According to the present invention, in the backlight apparatus having a light emitting diode device as its light source, the blue light Lb, the green light Lg and the red light Lr emitted from the light emitting diode device are mixed by the dichroic mirror, so that only pure light of Lb, Lr and Lg are optically mixed without color irregularities. Therefore, the white light Lw having high color purity and high color reproductively can be surface-emitted to the liquid crystal display panel 2. Specifically, the present invention is effective to a backlight apparatus for a television receiver and the like, which is required to have high image quality.

BEST MODE FOR CARRYING OUT THE INVENTION

In the following, embodiments of the present invention are described, however this description is intended to confirm the invention defined in the present specification. Accordingly, even if there exists an embodiment which is not described in the embodiments, this does not mean that such embodiment does not correspond to the present invention. To the contrary, even if it is described as an embodiment below, this does not mean that the embodiment does not correspond to any invention other than the invention.

Hereinafter, embodiments of the present invention will be explained referring to accompanying drawings.

First Embodiment

Figure 3:
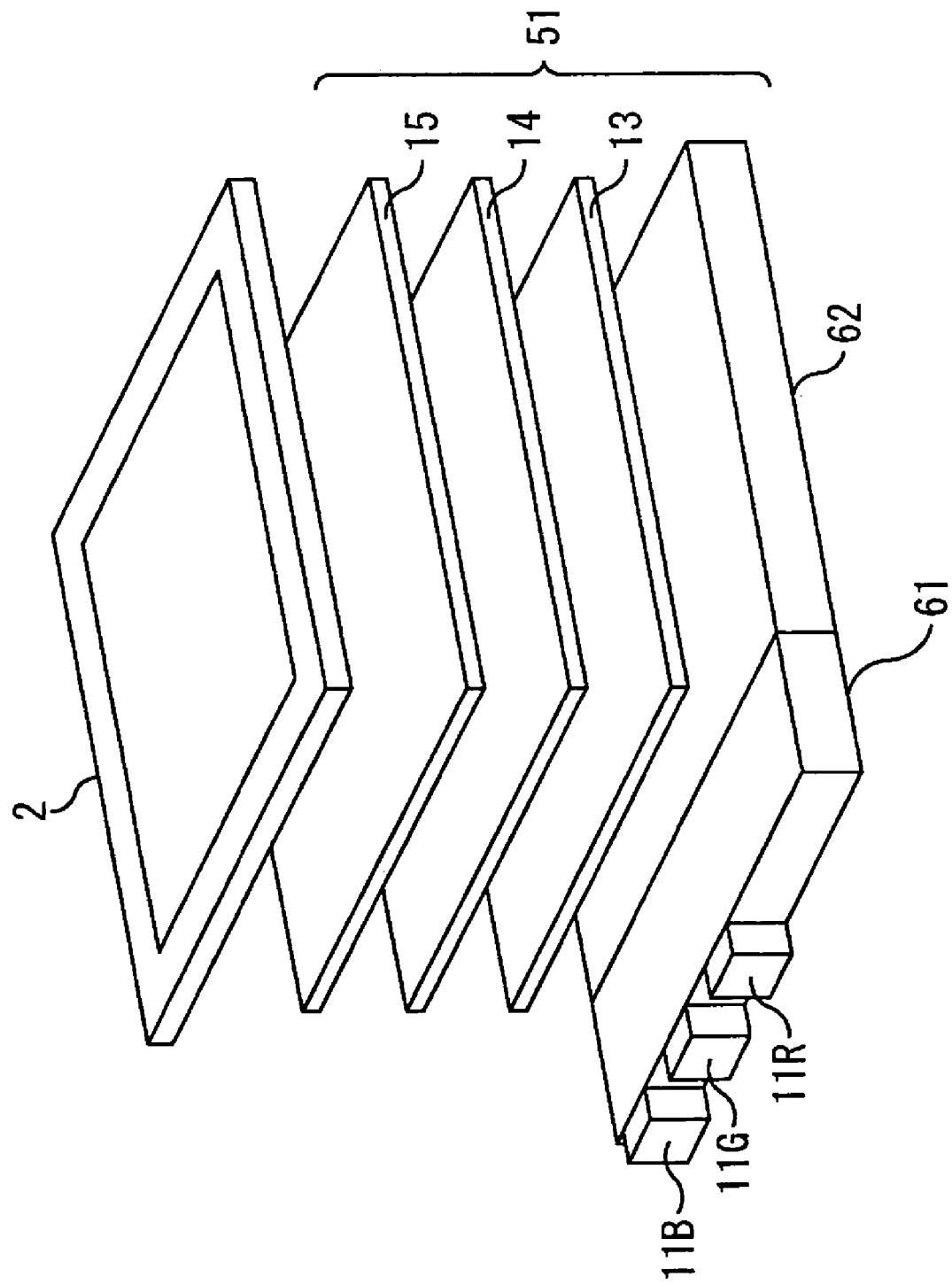
FIG. 3 is a perspective view showing a configuration of a backlight apparatus to which the present invention is applied.

FIG. 3 shows a configuration example of a backlight apparatus 51 to which the present invention is applied. The present embodiment is an example in which a relay dichroic mirror system is adopted for color mixing of BGR primary color light. In the backlight apparatus 51, an optical unit 61 and a light guiding plate 62 are provided in place of the light guiding path 12A and the reflection path 12B in the backlight apparatus 51 of FIG. 1. Because other portions are similar to the case in FIG. 1, explanations for these are duly omitted.

Figure 1:
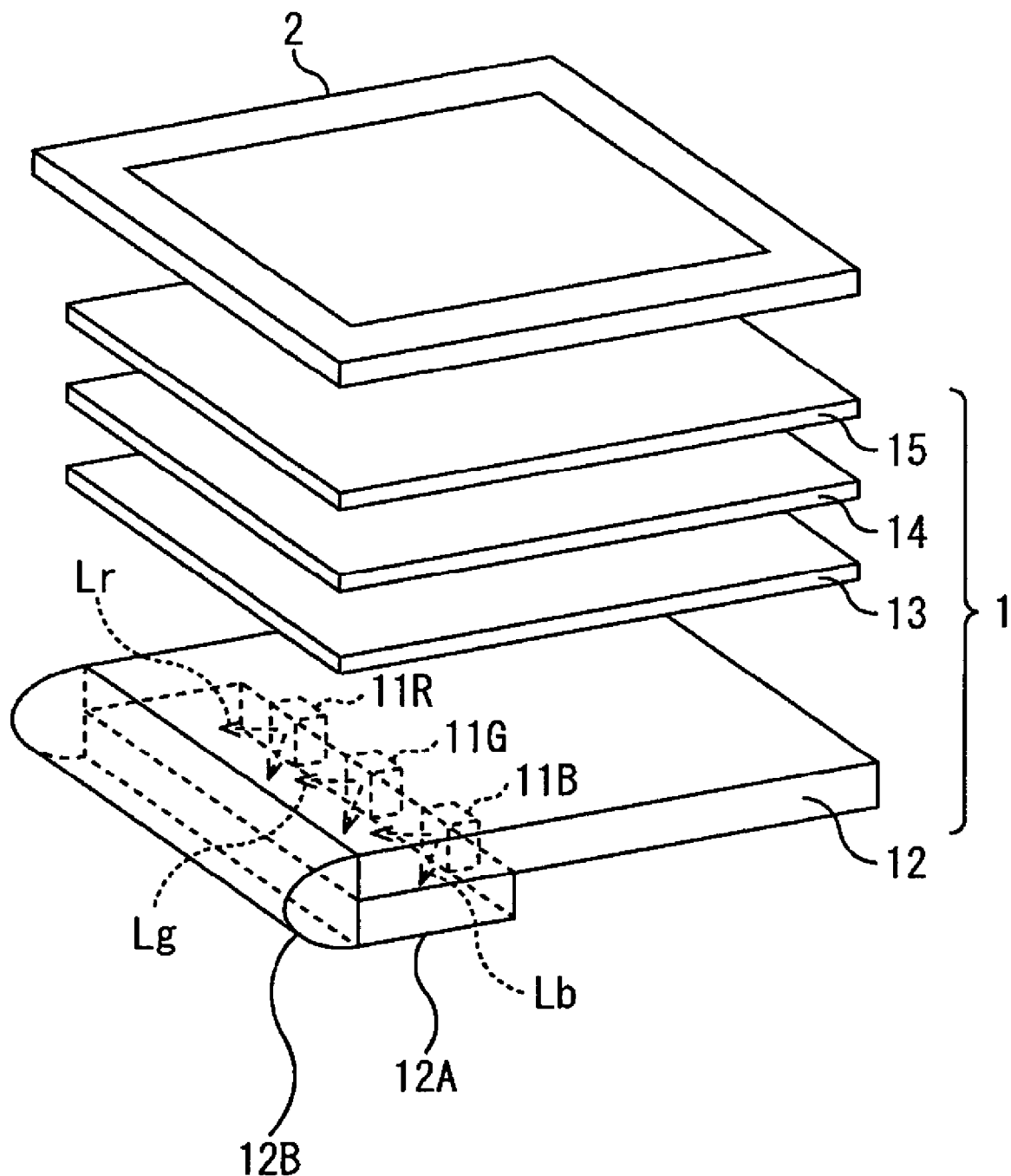
FIG. 1 is a perspective view showing a configuration of a conventional backlight apparatus.
Figure 2:
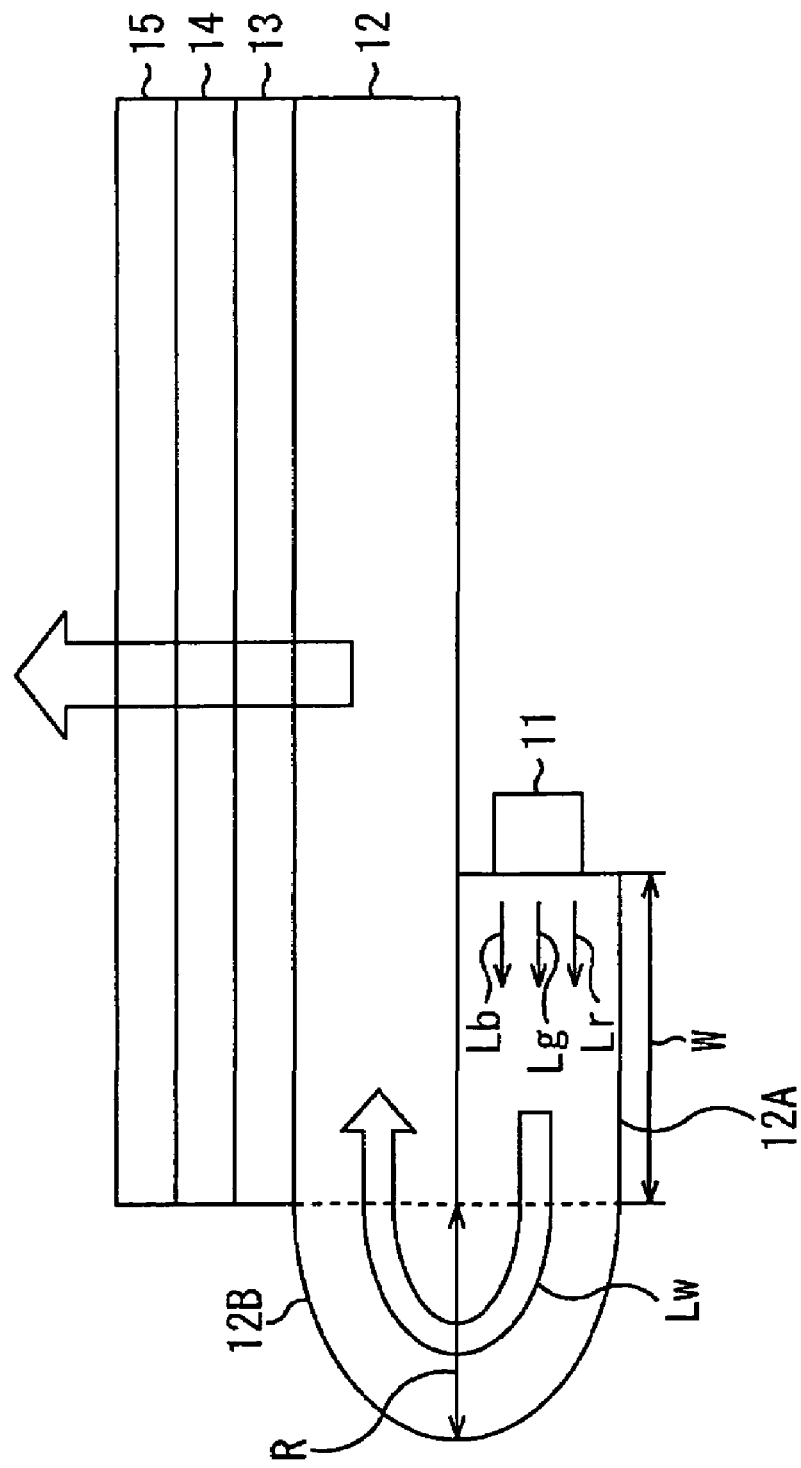
FIG. 2 is a cross-sectional view of a light guiding plate of FIG. 1.

As a backlight apparatus, as shown in FIG. 1 and FIG. 3, there are an edge light type in which an LED device or a CCFL (Cold Cathode Fluorescent Lamp) is disposed at the side surface of a light guiding plate and a direct type (it is also called as an area light type or a backlight type) in which a plurality of lamps and an LED light source are disposed immediately under a liquid crystal display panel. The edge light type is explained here as an example, however, as described later, the present invention can also be applied to the direct type in the similar way.

LED devices 11B, 11R, 11G and a light guiding plate 62 are joined to an optical unit 61.

Figure 4:
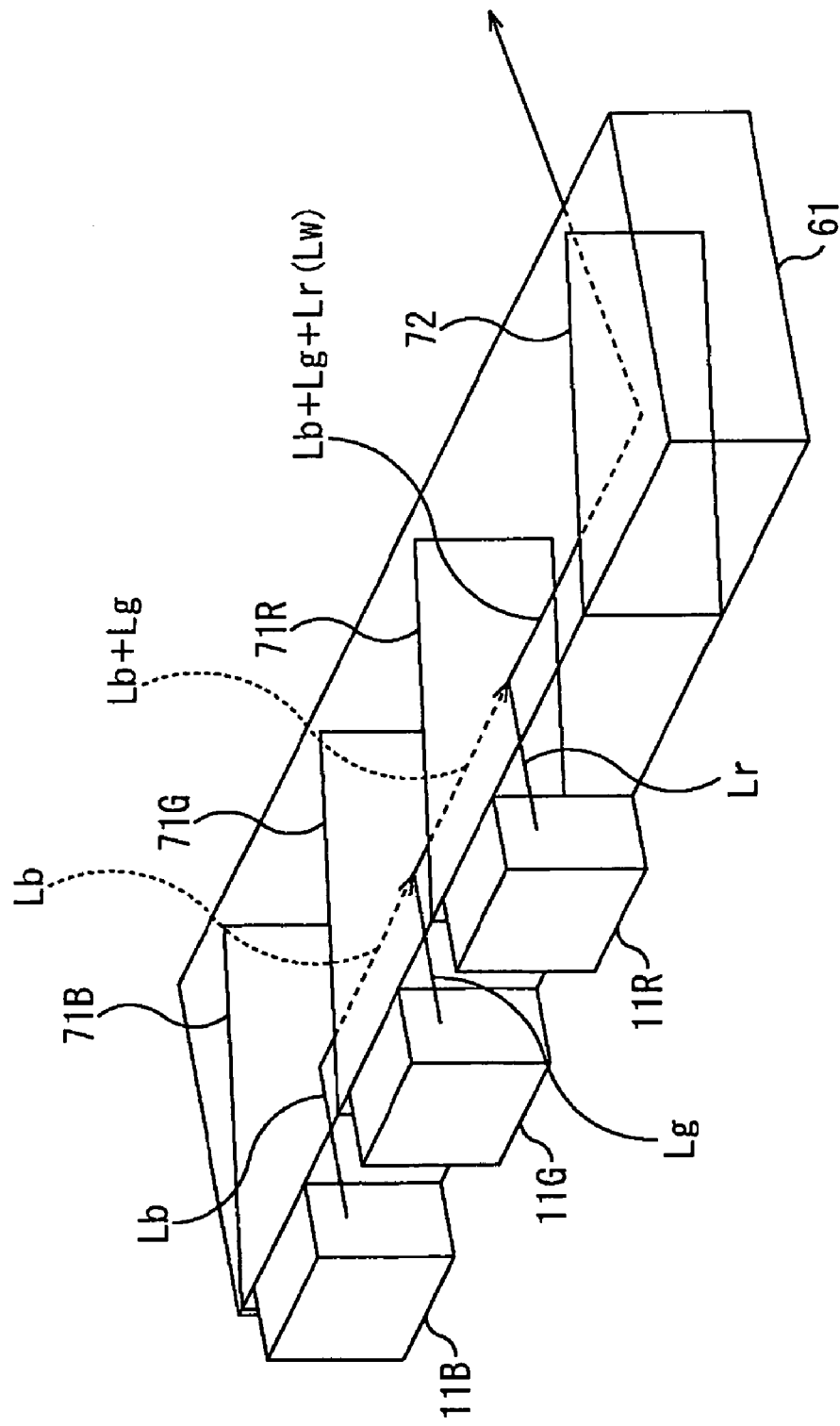
FIG. 4 is a view showing a configuration example of an optical unit of FIG. 3.
Figure 5:
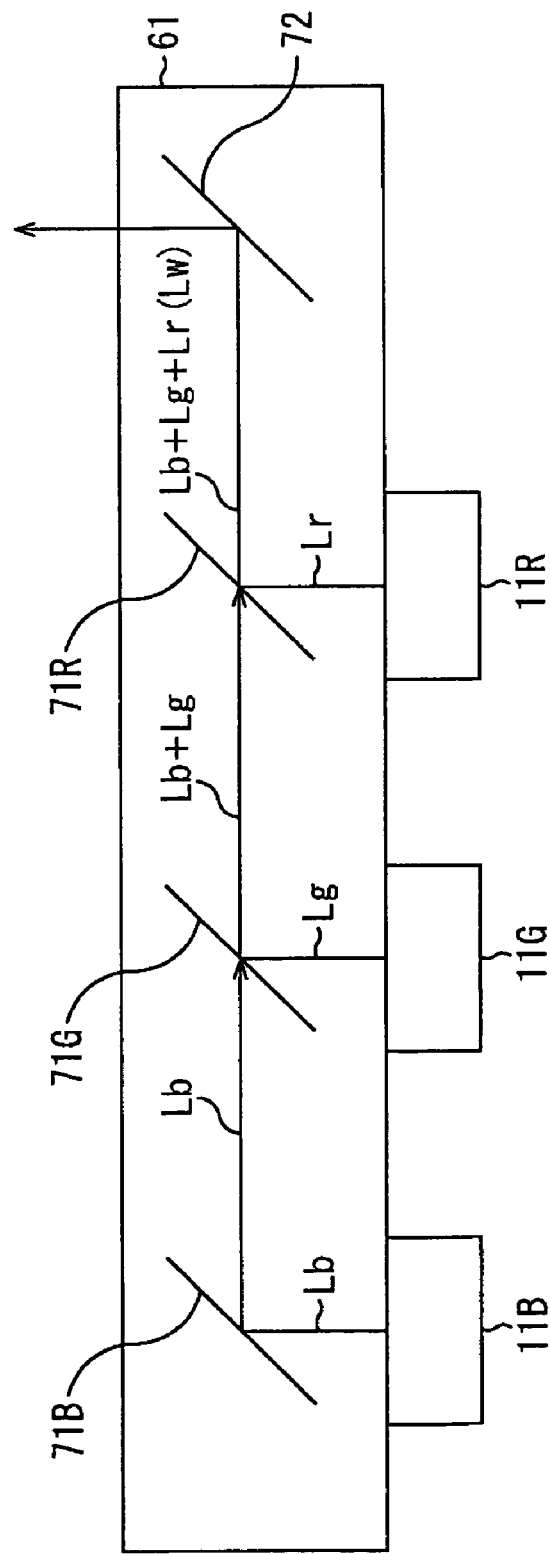
FIG. 5 is another view showing the configuration example of the optical unit of FIG. 3.

In the inside of the optical unit 61, as shown in a perspective view of the optical unit 61 in FIG. 4 and in a cross sectional view of the optical unit 61 viewed from the above in FIG. 5, there are disposed a dichroic mirror 71B which transmits green light Lg and red light Lr and reflects blue light Lb, a dichroic mirror 71G which transmits the blue light Lb and the red light Lr and reflects the green light Lg, and a dichroic mirror 71R which transmits the blue light Lb and the green light Lg and reflects the red light Lr, and they transmit or reflect the light emitted from the LED devices 11B, 11G and 11R to mix and form the white light Lw. In addition, a mirror 72 for performing total reflection is disposed so that the white light Lw formed by the dichroic mirrors 71B, 71G and 71R is to be entered to the light guiding plate 62.

In other words, the blue light (Lb) emitted from the LED device 11B is reflected by the dichroic mirror 71B toward the dichroic mirror 71G.

The light (Lb+Lg), in which the blue light Lb which is reflected by the dichroic mirror 71B and transmitted through the dichroic mirror 71G and the green light Lg which is emitted from the LED device 11G and reflected by the dichroic mirror 71G are mixed, is emitted toward the dichroic mirror 71R.

(Lb+Lg+Lr), in which the mixed light of blue and green which is emitted from the diachronic mirror 71G and transmitted through the dichroic mirror 71R and the red light (Lr) which is emitted from the LED device 11R and reflected by the dichroic mirror 71R are mixed, is emitted toward the total reflection mirror 72 (that is, the white light Lw is emitted toward the total reflection mirror 72).

From the total reflection mirror 72, the mixed light of blue, green and red (Lb+Lg+Lr=Lw: white light) emitted from the dichroic mirror 71R is emitted toward the light guiding plate 62.

The light guiding plate 62 guides the white light Lw emitted from the optical unit 61 and leads the light effectively uniformed by a predetermined structure (for example, a structure for uniforming an emitted light by forming dots on the bottom portion thereof to reflect some of the guided light by the dots) to the diffusion sheet 13 effectively.

As described above, unlike in the conventional case of natural mixing, the blue light Lb, the green light Lg and the red light Lr are forcibly mixed by the dichroic mirror 71 so that only pure blue light Lb, pure green light Lg and pure red light Lr are optically mixed. Therefore, the backlight apparatus having an LED device as its light source can surface-emits the white light Lw capable of reproducing high color (so-called higher color purity) to the liquid crystal display panel 2 while suppressing occurring color irregularities.

It is to be noted that, in the example in FIG. 3, there is provided only one for each of the LED devices 11B, 11G and 11R, respectively emitting the blue light Lb, the green light Lg and the red light Lr, for simplicity, however, each of the LED devices 11B, 11G and 11R may be multiply provided in a predetermined ratio. In addition, the configuration of the optical unit 61 (arrangement of the dichroic mirror 71 and the total reflection mirror 72) can be changed in accordance with a number or a joining position of the LED device 11.

Figure 6:
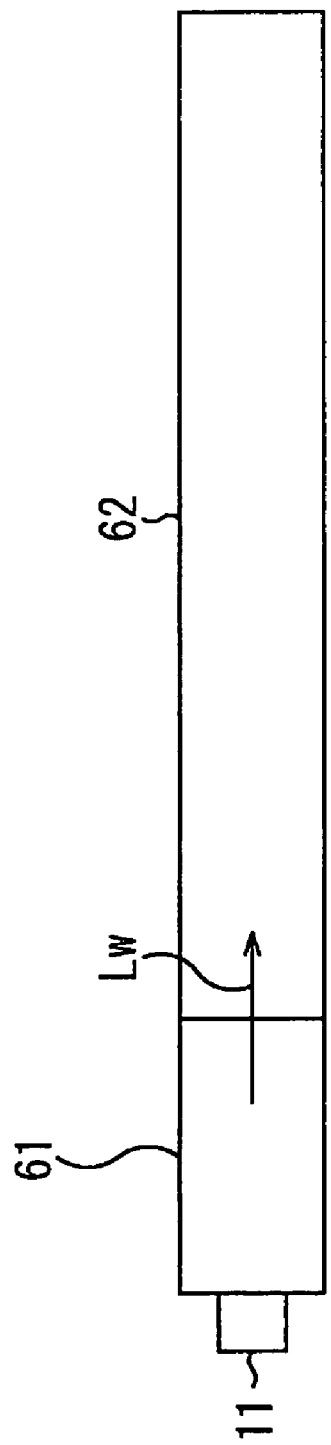
FIG. 6 is a view showing a joining relation between a LED device, the optical unit and a light guiding plate of FIG. 3.
Figure 7:
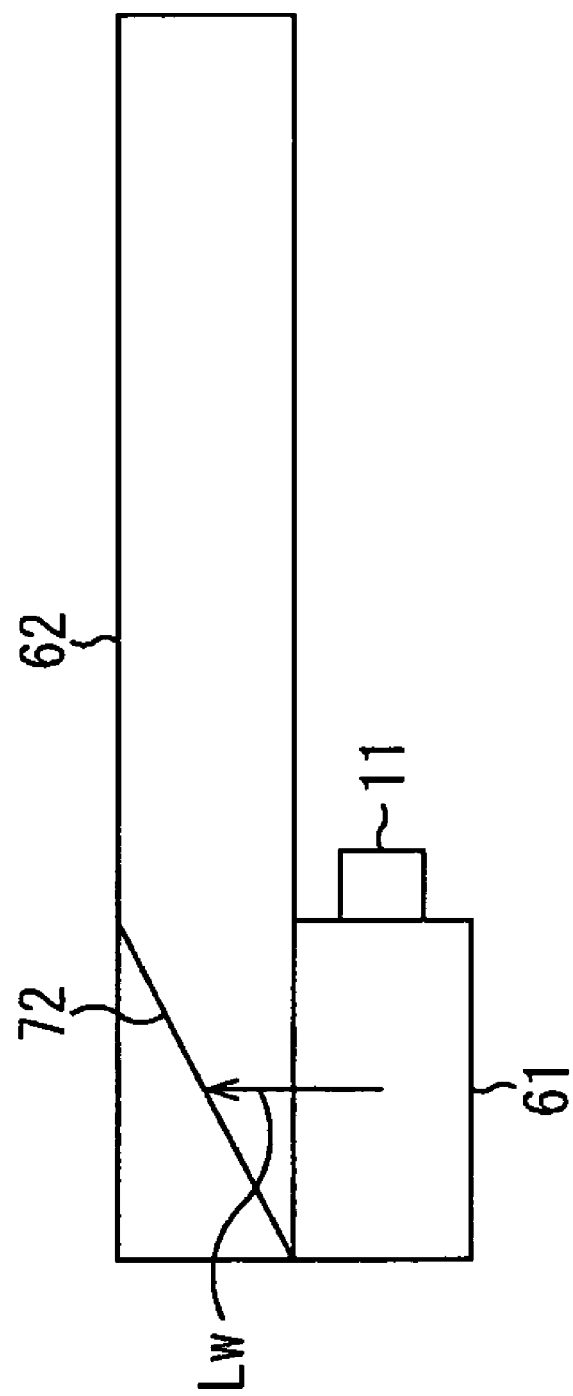
FIG. 7 is a view showing another joining relation between the LED device, the optical unit and the light guiding plate of FIG. 3.
Figure 8:
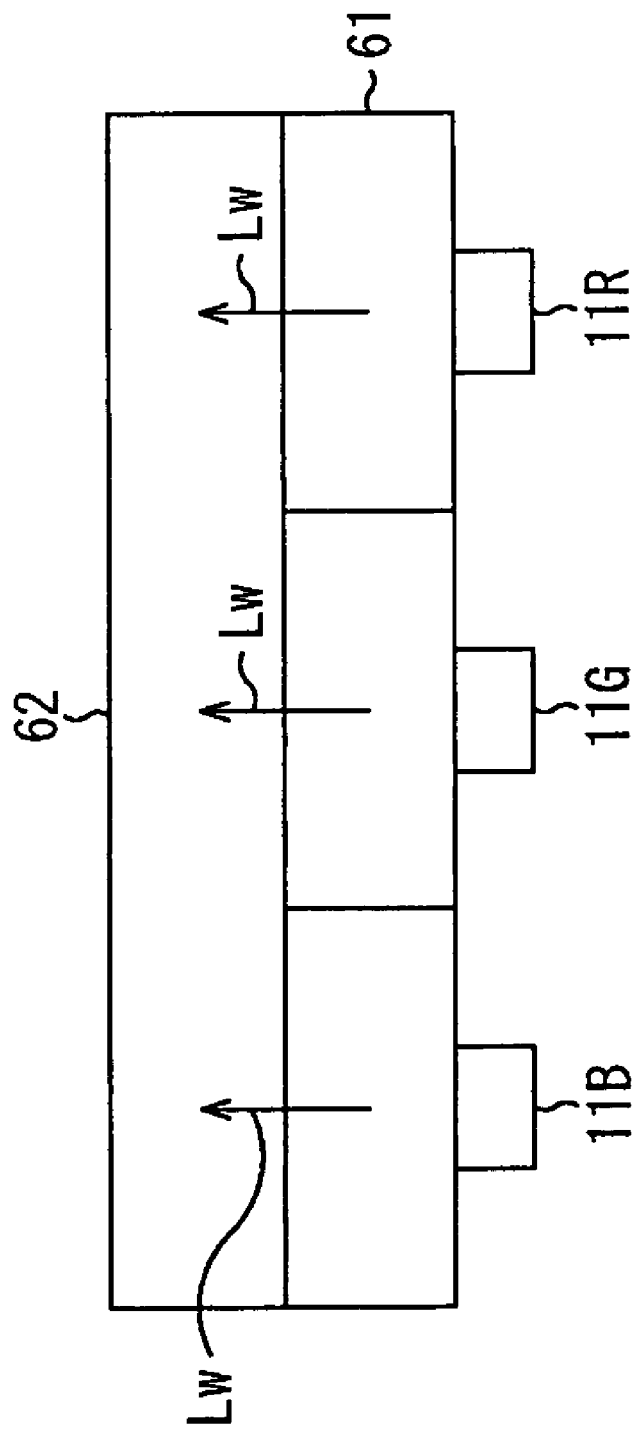
FIG. 8 is a view showing another joining relation between the LED device, the optical unit and the light guiding plate of FIG. 3.

In addition, in the example of FIG. 3, the LED device 11, the optical unit 61 and the light guiding plate 62 are arranged and joined in a horizontal direction as shown in FIG. 6, however, they can be joined as shown in FIG. 7 or FIG. 8. In the case where the optical unit 61 is disposed an under surface of the light guiding plate 62 as shown in FIG. 7, the LED device 11 and the dichroic mirror 71 (not shown) of the optical unit 61 are disposed in a back direction in the sheet of FIG. 7, and the total reflection mirror 72 is disposed in the light guiding plate 62 so that the mixed light (white light Lw) is to be led to the light guiding plate 62.

In the case of the example in FIG. 8, the optical unit 61 is disposed on under side of the light guiding plate 62. That is, this is an example of applying to the aforementioned direct type backlight apparatus. In this case, the LED devices 11B, 11G are 11R are joined to the optical unit 61. The dichroic mirror 71 (not shown) is disposed in the inside of the optical unit 61 so that the white light Lw mixed by the dichroic mirror 71 is entered directly to the light guiding plate 62.

Figure 9:
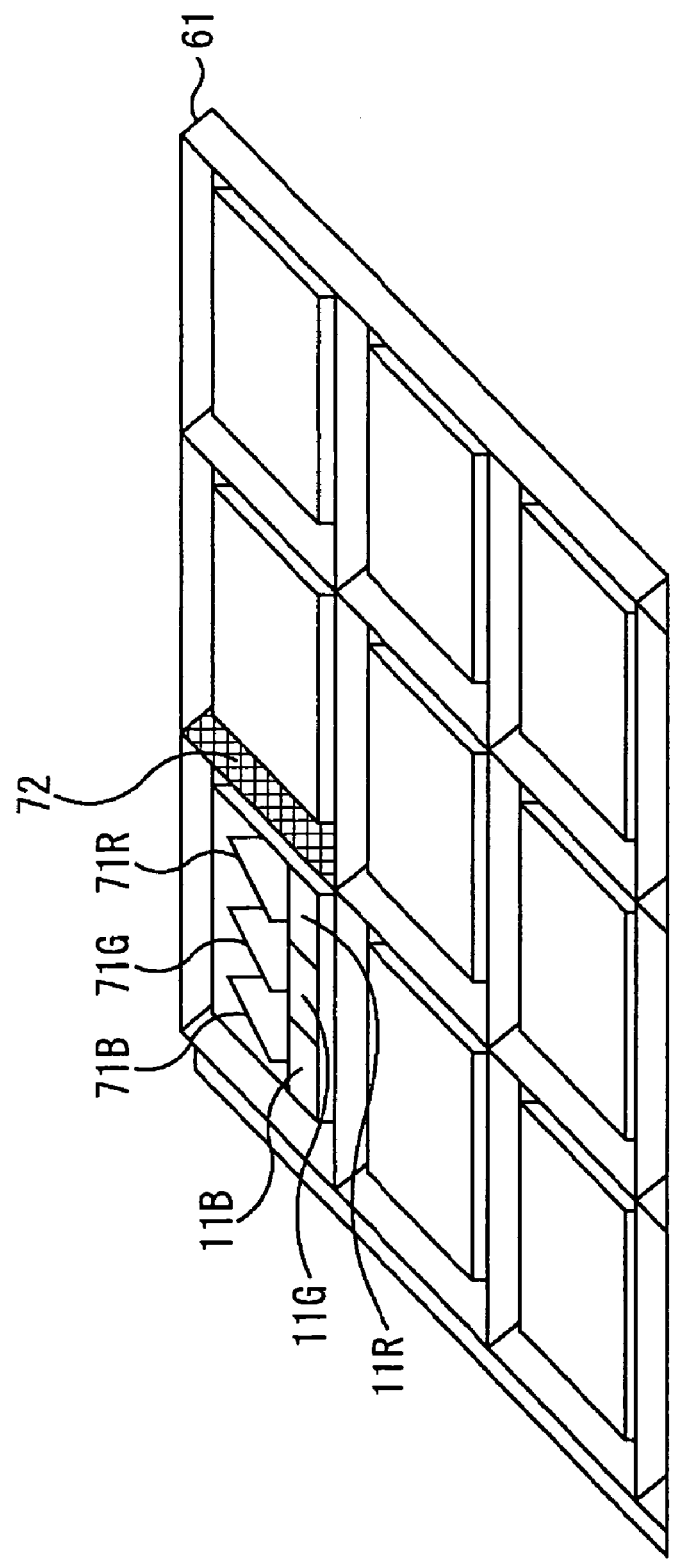
FIG. 9 is a view showing another configuration example of the optical unit of FIG. 3.

Further, in addition to the arrangement in which the LED devices 11B, 11G and 11R are arranged under the optical unit 61, as shown in FIG. 9, they can be arranged such that chip type LED devices 11B, 11G, 11R, the dichroic mirror 71B, 71G, 71R and the total reflection mirror 72 are arranged in a plane to form a direct type plane LED backlight apparatus.

The Second Embodiment

Figure 10:
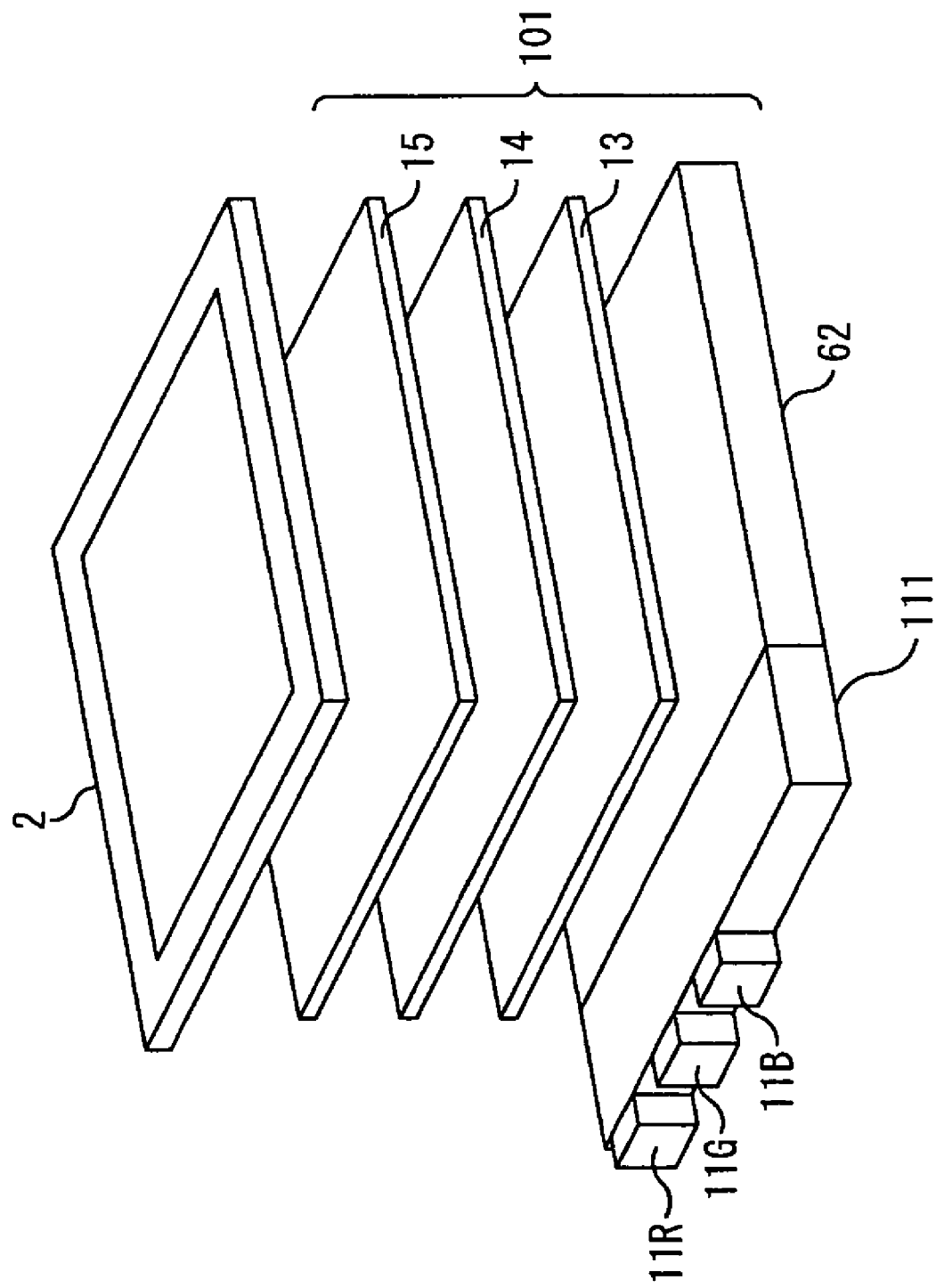
FIG. 10 is a perspective view of a configuration of another backlight apparatuses to which the present invention is applied.

FIG. 10 shows a configuration example of a backlight apparatus 101 to which the present invention is applied. The present embodiment is an example in which a cross dichroic mirror system is adopted for color mixing of BGR primary color light. In the backlight apparatus 101, an optical unit 111 is provided in place of the optical unit 61 of the backlight apparatus 51 of FIG. 3. Because other portions are similar to the case of FIG. 3, explanations for these are duly omitted.

Figure 11:
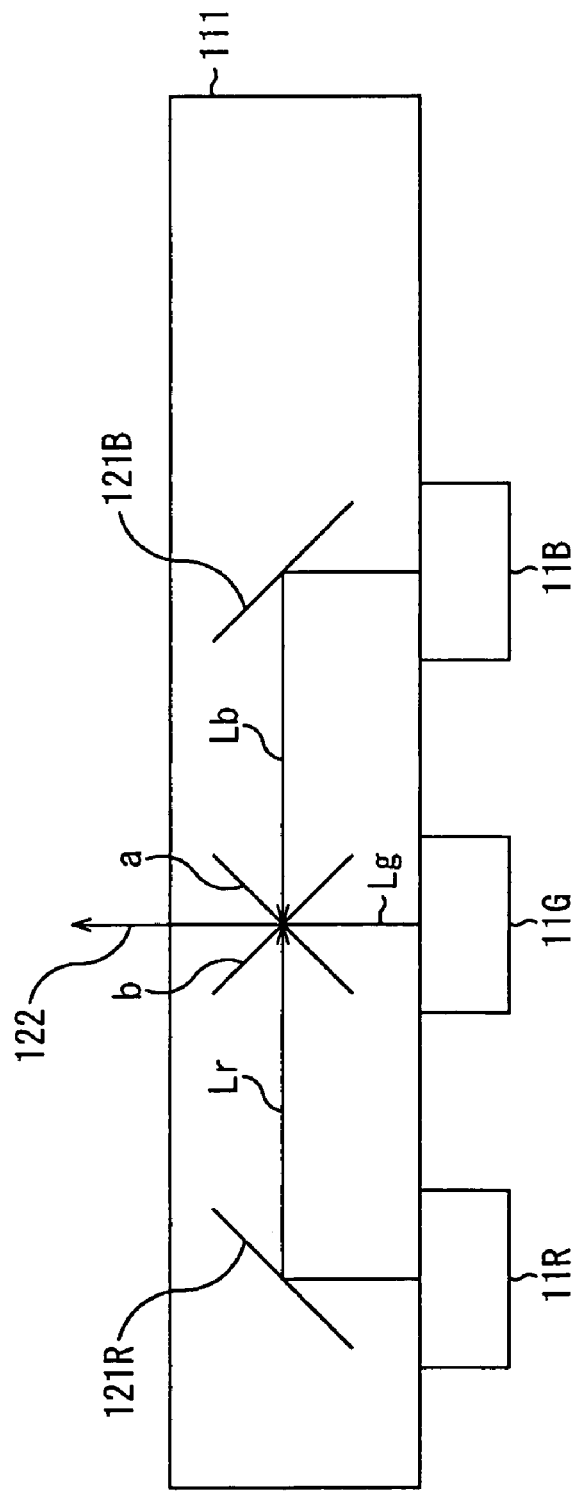
FIG. 11 is a cross-sectional view of an optical unit of FIG. 10.

Similar to the optical unit 61, LED devices 11B, 11G, 11R and the light guiding plate 62 are joined to an optical unit 111. In the inside of the optical unit 111, as shown in a cross-sectional view of the optical unit 111 viewed from the above in FIG. 11, a dichroic mirror 121R, a dichroic mirror 121B and a cross dichroic mirror 122 are disposed corresponding to the LED devices 11R, 11B and 11G.

The dichroic mirror 121R reflects the red light Lr and transmits other colors, and the dichroic mirror 121B reflects the blue light Lb and transmits other colors. The cross dichroic mirror 122 has a structure in which a mirror (a) which reflects the red light Lr and transmits other colors and a mirror (b) which reflects the blue light Lb and transmits other colors are crossed each other.

The red light Lr emitted from the LED device 11R is reflected by the dichroic mirror 121R and moves toward the cross dichroic mirror 122 direction. The blue light Lb emitted from the LED device 11B is reflected by the dichroic mirror 121B and moves toward the cross dichroic mirror 122 direction. The green light Lg emitted from the LED device 11G is emitted directly toward the cross dichroic mirror 122 direction.

The red light Lr entered from the dichroic mirror 121R and the blue light Lb entered from the dichroic mirror 121B are reflected by the cross dichroic mirror 122 and exit to a surface where they exit. The green light Lg emitted from the LED device 11G passes through the cross dichroic mirror 122 and exits to the surface.

Therefore, from the optical unit 111 (cross dichroic mirror 122), white light (Lb+Lg+Lr=Lw) which is forcibly mixed of the blue light Lb, the green light Lg and the red light Lr is emitted toward the light guiding plate 62.

The light guiding plate 62 guides the white light Lw entered from the optical unit 111 and leads the light, which is effectively uniformed by a predetermined structure, to a diffusion sheet 13 effectively.

As described above, because the blue light Lb, the green light Lg and the red light Lr are forcibly mixed by using the dichroic mirror 121R, 121B and the cross dichroic mirror 122, the optical unit 111 can be made small in size (the number of mirrors is reduced by one) in comparison with the optical unit 61 using the total reflection mirror 72 shown in FIG. 3. In addition, similar to the optical unit 61, because only the pure blue light Lb, the pure red light Lr and the pure green light Lg are optically mixed, color irregularities can be suppressed from occurring.

The Third Embodiment

Figure 12:
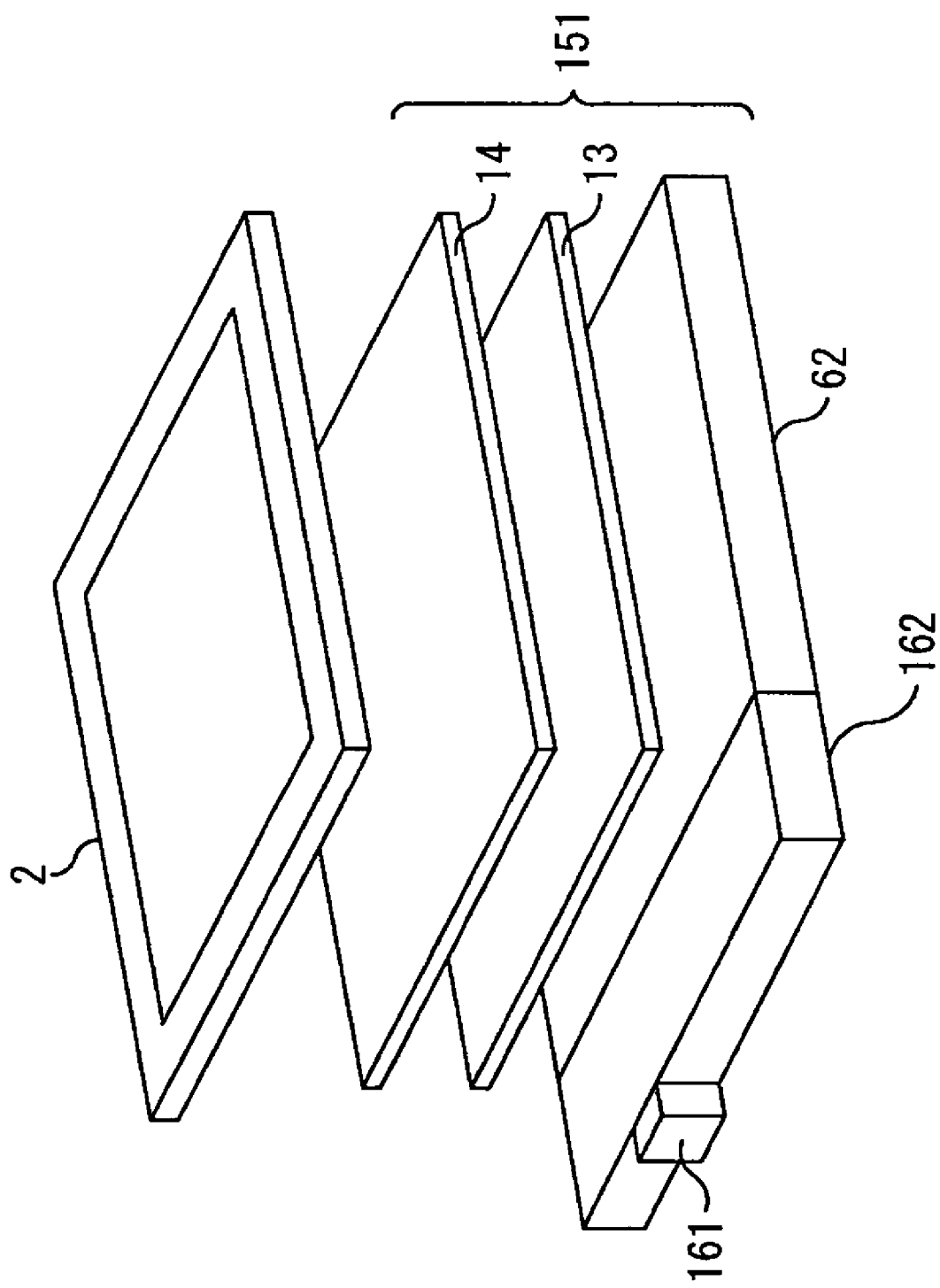
FIG. 12 is a perspective view of a configuration of another backlight apparatuses to which the present invention is applied.

FIG. 12 shows a configuration example of a backlight apparatus 151 to which the present invention is applied. The present embodiment adopts a polarization conversion system for an optical unit, which aligns a polarization direction of emission. In the backlight apparatus 151, an LED device 161 and an optical unit 162 are provided in place of the LED device 11 and the optical unit 61 of the backlight apparatus 51 in FIG. 3. In addition, the D-BEF sheet 15 of the backlight apparatus 51 of FIG. 3 is omitted.

The LED device 161 emitting white light Lw and the light guiding plate 62 are joined to the optical unit 162. In the inside of the optical unit 162, as shown in a cross-sectional view of the optical unit 162 viewed from the above in FIG. 13, a polarized beam splitter 171, a reflecting mirror 172 and a $\lambda/2$ phase difference plate 173 are disposed corresponding to the LED device 161.

The polarized beam splitter 171 (Polarized Beam Splitter: PBS) converges and transmits P-component light of the white light Lw emitted from the LED device 161, and emits it toward the light guiding plate 62 while reflecting S-component light toward the reflecting mirror 172. It is to be noted that the polarized beam splitter 171 polarized-splits the white light Lw into two linear polarizations (P-polarization and S-polarization) so as to have equal strengths and orthogonal polarized directions, respectively.

The reflecting mirror 172 reflects the S-component reflected by the polarized beam splitter 171 and emits it toward the $\lambda/2$ phase difference plate 173.

The $\lambda/2$ phase difference plate 173 converts the S-components light emitted from the reflecting mirror 172 into the P-component light, and emits it toward the light guiding plate 62.

Accordingly, from the optical unit 162, the P-component light of the white light Lw emitted by the LED device 161 and the P-component light which is converted from the S-component light by the $\lambda/2$ phase difference plate 172 (two P-component light rays) are emitted toward the light guiding plate 62.

As described above, because the P-component light of the white light Lw emitted by the LED device 161 and the P-component light which is converted from the S-component of the white light Lw (a plurality of light rays from one light source) are emitted toward the light guiding plate 62, a light utilization rate of a backlight in the back light apparatus having an LED device as its light source can be improved, as compared to the case where one white light ray LW is emitted to the light guiding plate 62. In other words, of the P+S-components emitted from the white light Lw, the S-component which is originally not in use is converted into the P-components and reused, whereby the light utilization rate of the backlight can be increased double.

In addition, because only the P-component light is entered to the light guiding plate 62, the D-BEF sheet which is used for converting the S-component into the P-component as described before is not necessary, the cost of the backlight apparatus 151 can be reduced by the cost of it and also the thickness of the backlight apparatus 151 can be reduced.

It is to be noted that, in the example of the backlight apparatus shown in FIG. 12, each one of the LED device 161, the polarized beam splitter 171, the reflecting mirror 172 and the λ/2 phase difference plate 173 are respectively provided for simplicity, however they can be multiply provided in a predetermined ratio.

Figure 13:
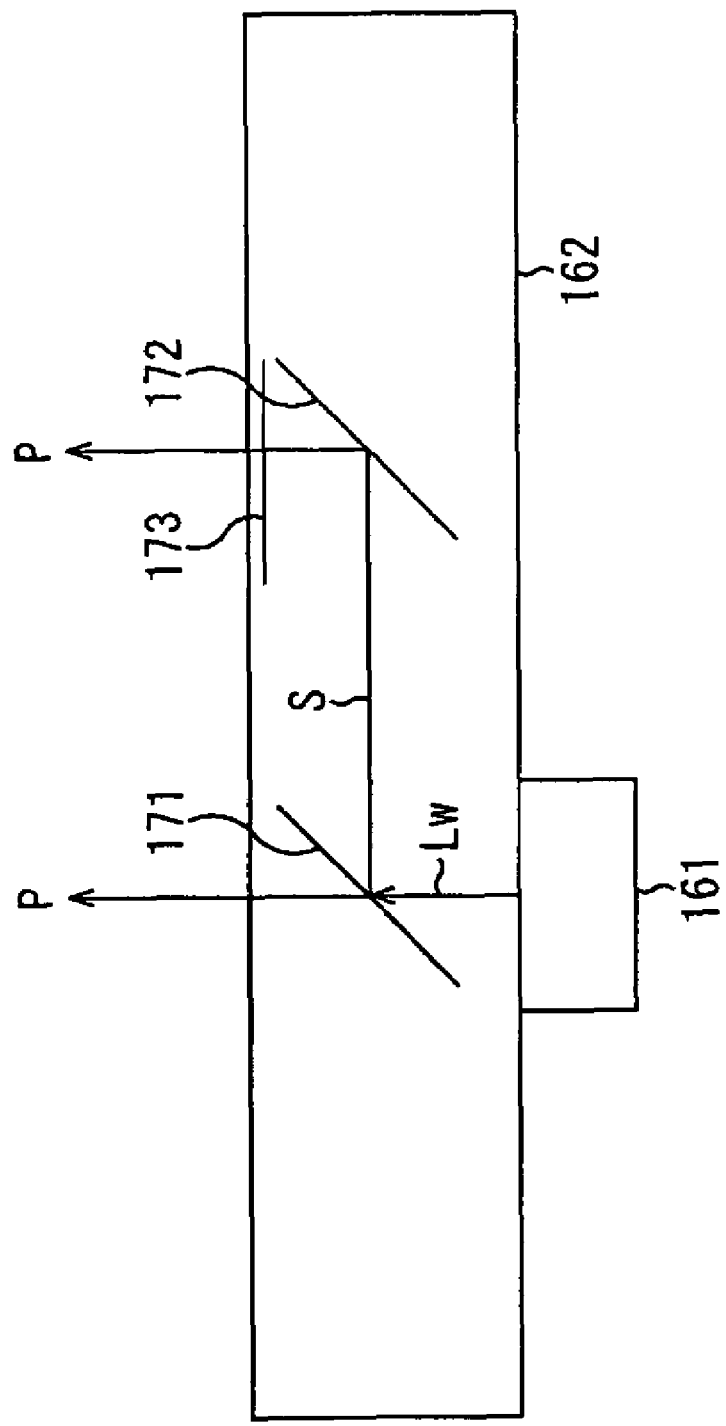
FIG. 13 is a view showing a configuration example of an optical unit of FIG. 12.
Figure 14:
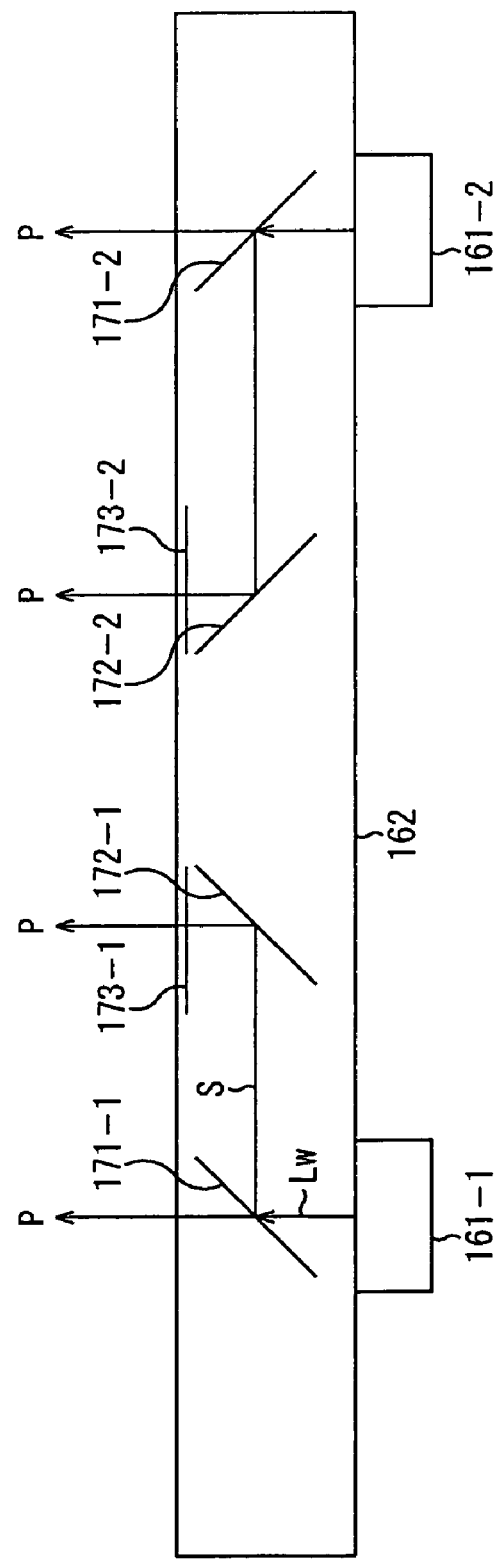
FIG. 14 is a view showing another configuration example of the optical unit of FIG. 12.

In this case, the backlight apparatus may be configured by arranging the structure shown in FIG. 13 in the order, or may be configured by disposing the LED device 161, the polarizing beam splitter 171, the reflecting mirror 172 and the λ/2 phase difference board 173 symmetrically, as shown in FIG. 14. In an example of FIG. 14, two pair of the polarized beam splitter 171, the reflecting mirror 172 and the λ/2 phase difference plate 173 are symmetrically disposed. As a result of providing them in a symmetric structure as above, the optical unit 162 can be made more compact and light equalization in the backlight apparatus 151 can be achieved.

The Fourth Embodiment

Figure 15:
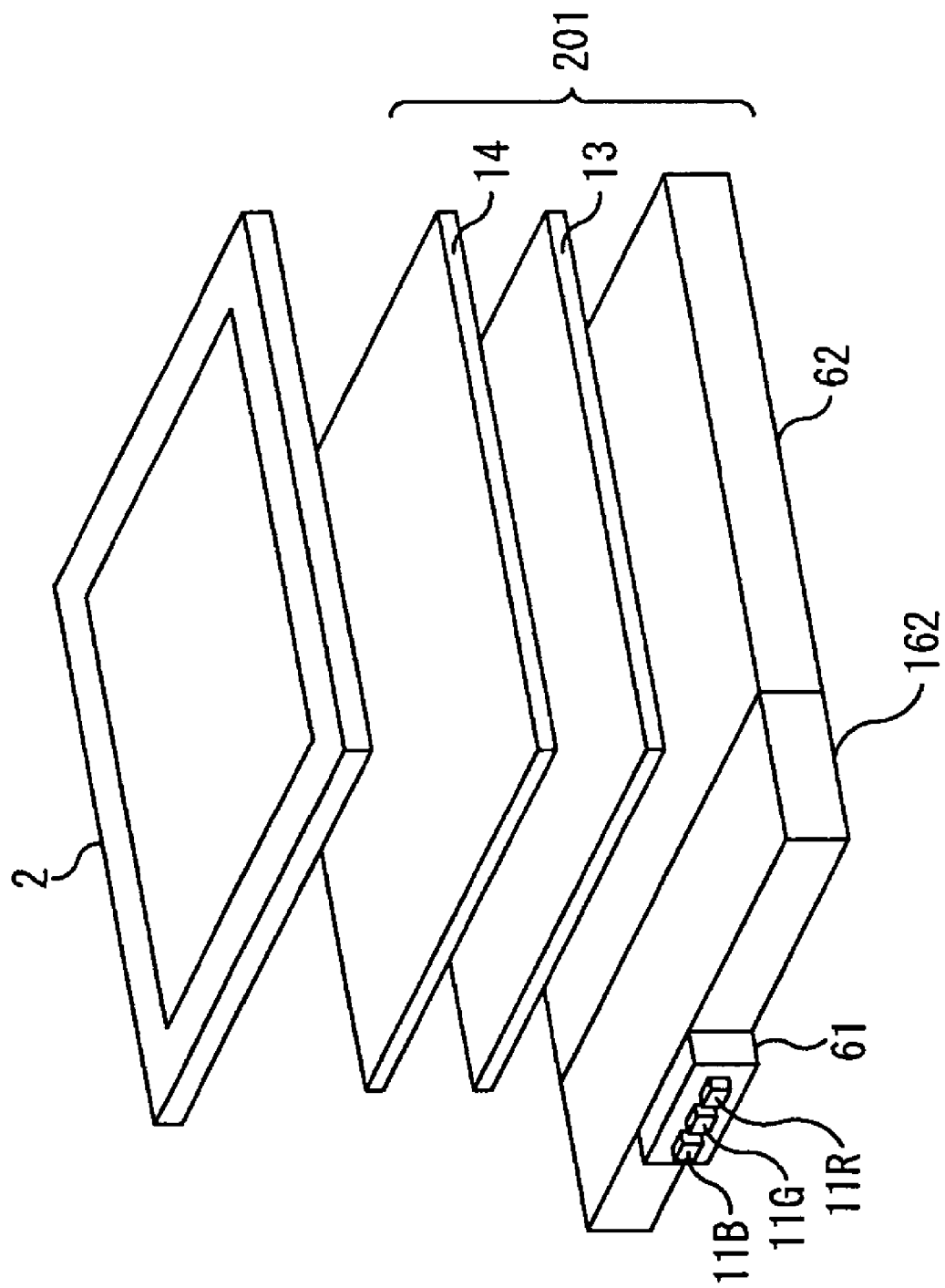
FIG. 15 is a perspective view showing a configuration of another backlight apparatuses to which the present invention is applied.

FIG. 15 shows a configuration example of a backlight apparatus 201 to which the present invention is applied. The present embodiment is an example in which a polarization conversion is carried out after the color mixture of the BGR primary color light. In the backlight apparatus 201, the optical unit 61 (FIG. 3) which forcibly mixes the light from the LED devices 11B, 11G, and 11R is provided in place of the LED device 161 of the backlight apparatus 151 of FIG. 12.

Figure 16:
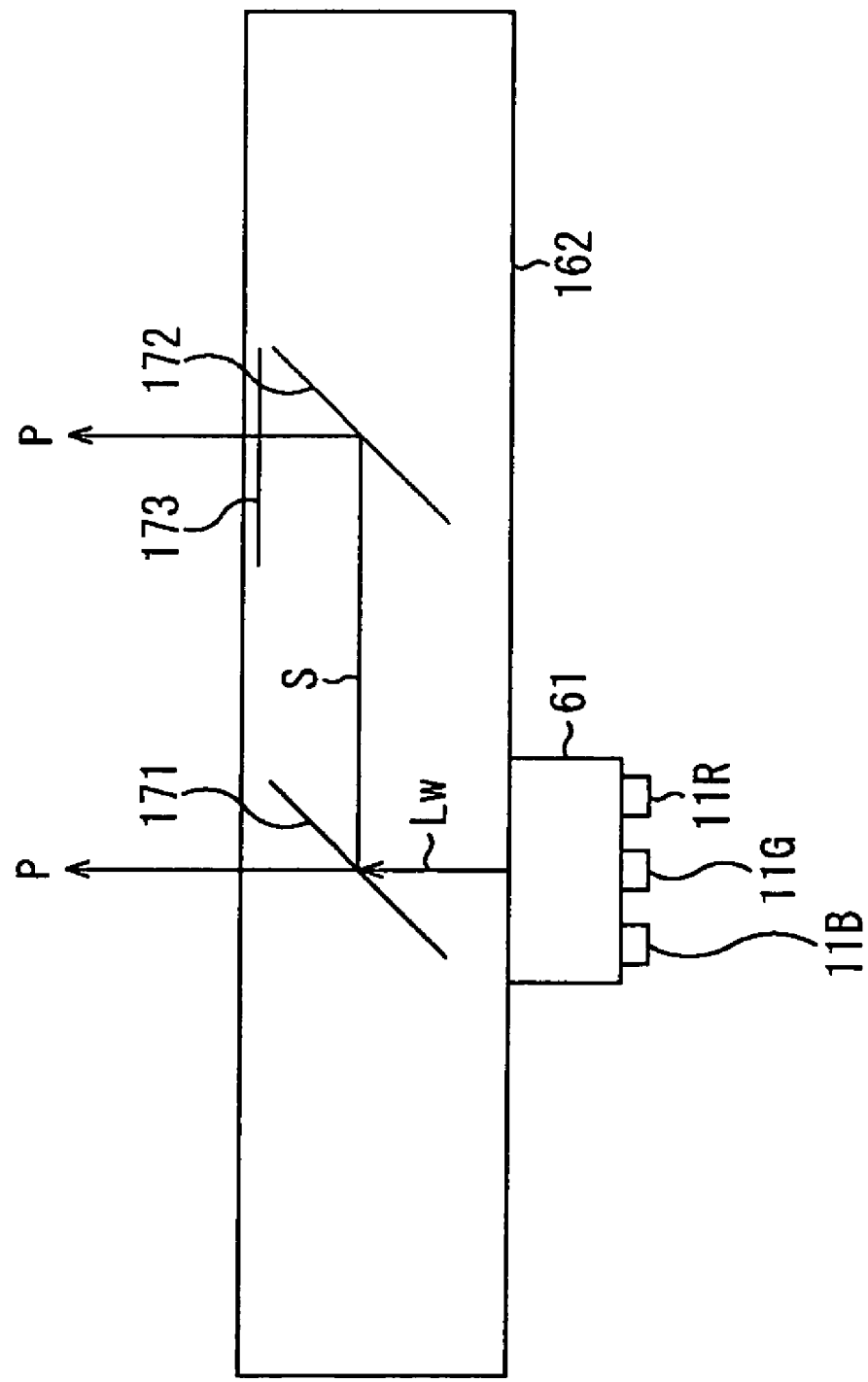
FIG. 16 is a view showing a configuration example of an optical unit of FIG. 15.

In this case, as shown in FIG. 16, the polarized beam splitter 171 of the optical unit 162 converges and transmits the P-component of the white light (Lb+Lg+Lr=Lw) from the optical unit 61 which is obtained by forcibly mixing the blue light Lb, the green light Lg and the red light Lr emitted from the LED device 11B, 11g and 11R, and emits it to the light guiding plate 62 while reflecting the S-component of the light toward the reflecting mirror 172.

The reflecting mirror 172 reflects the S-component reflected by the polarized beam splitter 171, and emits it toward the λ/2 phase difference plate 173. The λ/2 phase difference plate 173 converts the S-component light emitted from the reflecting mirror 172 into the P-component light, and emits it toward the light guiding plate 62.

Accordingly, in this example, from the optical unit 162, the P-component light of the white light Lw obtained by forcibly mixing the LED device 11B, 11g and 11R by the optical unit 61 and the P-component light which is converted from the S-component light are emitted toward the light guiding plate 62.

As described above, the blue light Lb, the green light Lg and the red light Lr emitted from the LED device 11 by the optical unit 61 are forcibly mixed and formed the white light Lw, and the optical unit 162 reuses the S-component light which has not been in use, so that color purity and light utilization rate can be improved in the backlight apparatus having an LED device as its light source.

Figure 17:
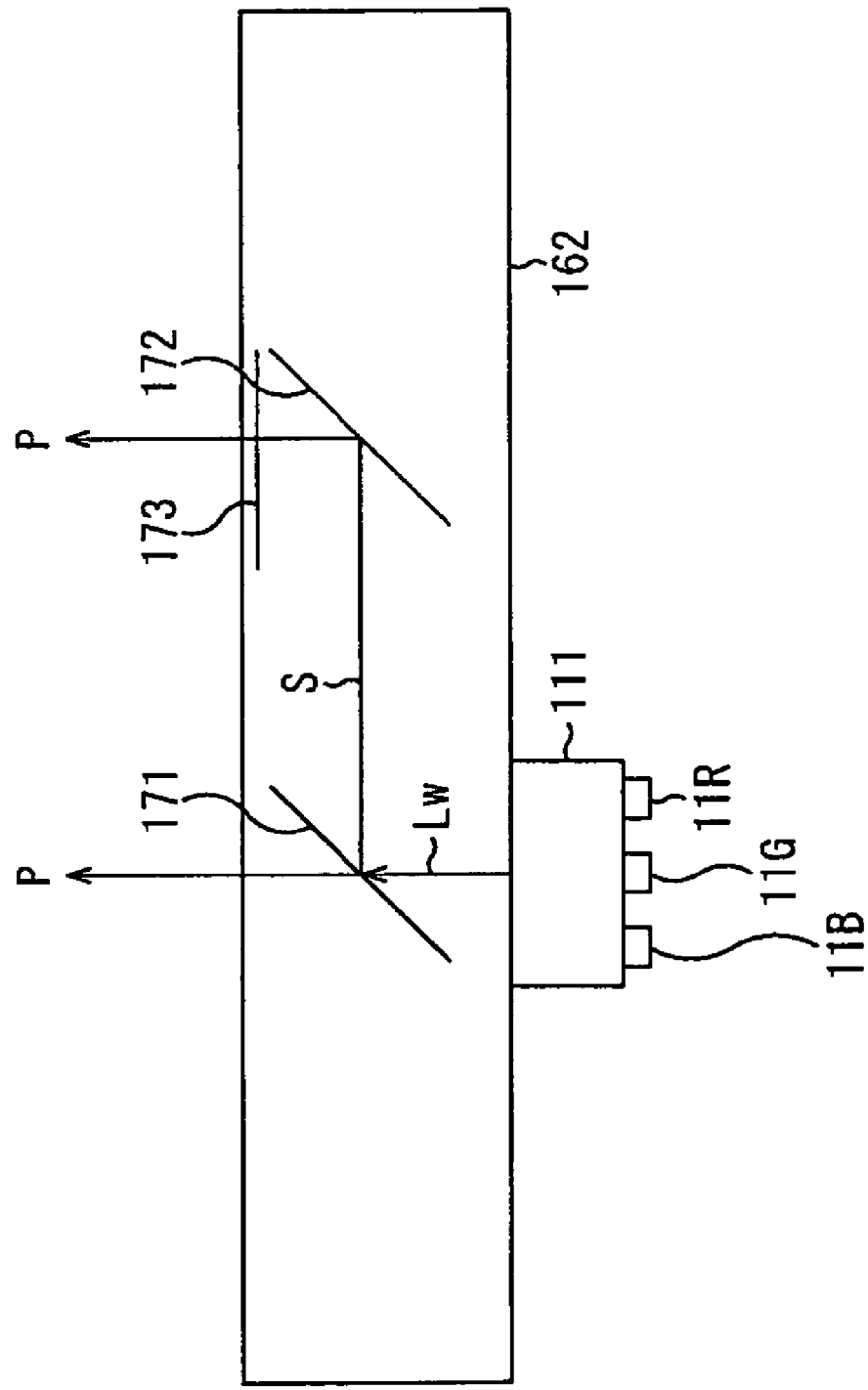
FIG. 17 is a view showing another configuration example of the optical unit of FIG. 15.

It is to be noted that, in FIG. 15, the optical unit 61 which forcibly mixes the light with the dichroic mirror 71 and the total reflection mirror 72 is used, however, in place of it, as shown in FIG. 17, the optical unit 111 which forcibly mixes the light with the cross dichroic mirror 122 shown in FIG. 10 can also be used.

The Fifth Embodiment

Figure 18:
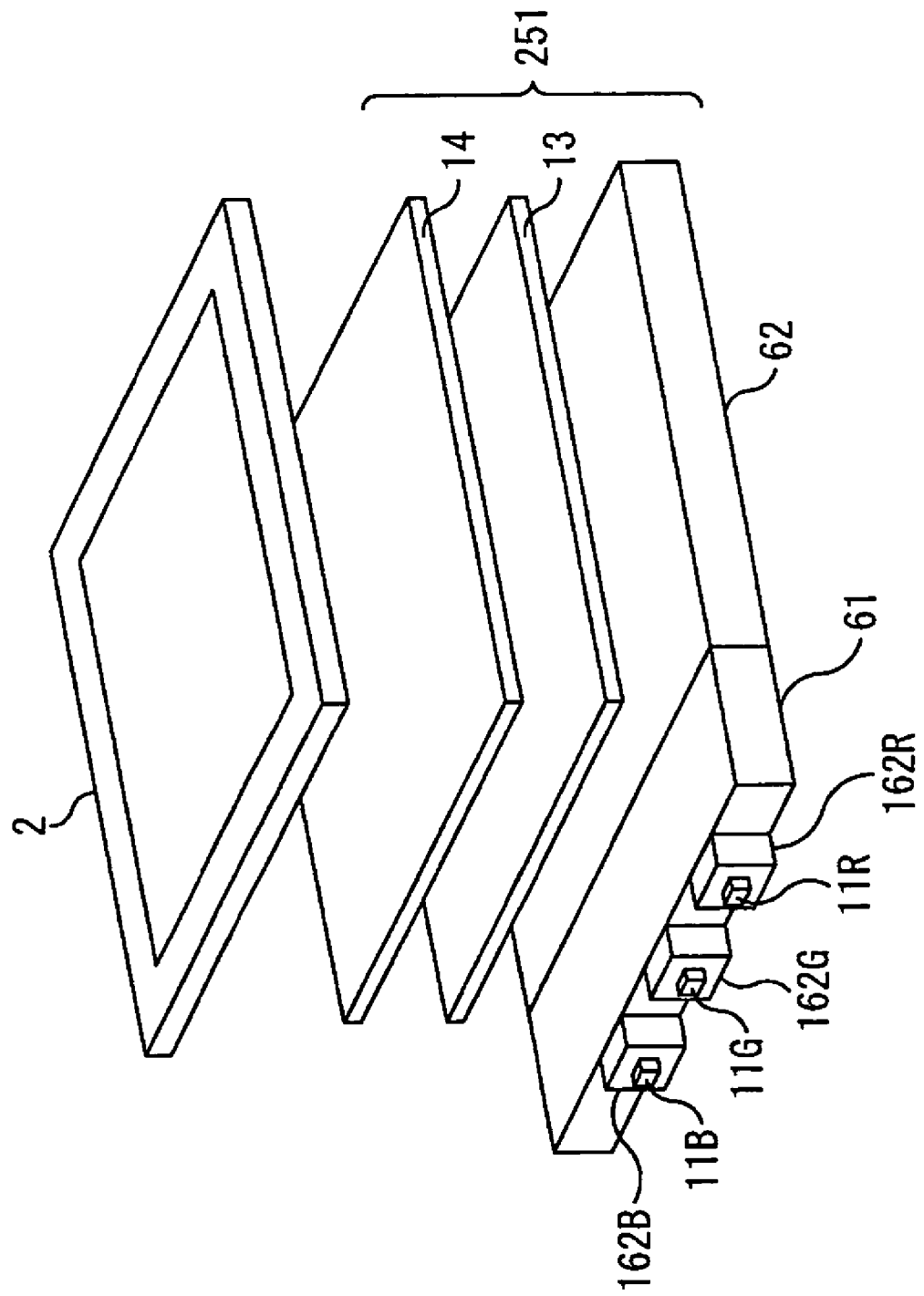
FIG. 18 is a perspective view of another configuration of a backlight apparatus to which the present invention is applied.

FIG. 18 shows a configuration example of a backlight apparatus 251 to which the present invention is applied. The present embodiment is an example in which the color mixture of the BGR primary color light is carried out after the polarization conversion. In the backlight apparatus 251, optical units (units for converting the S-component into the P-component) 162R, 162G and 162B are provided corresponding to the LED devices 11R, 11G and 11B, in place of the LED device 11 of the backlight apparatus 51 of FIG. 3.

Figure 19:
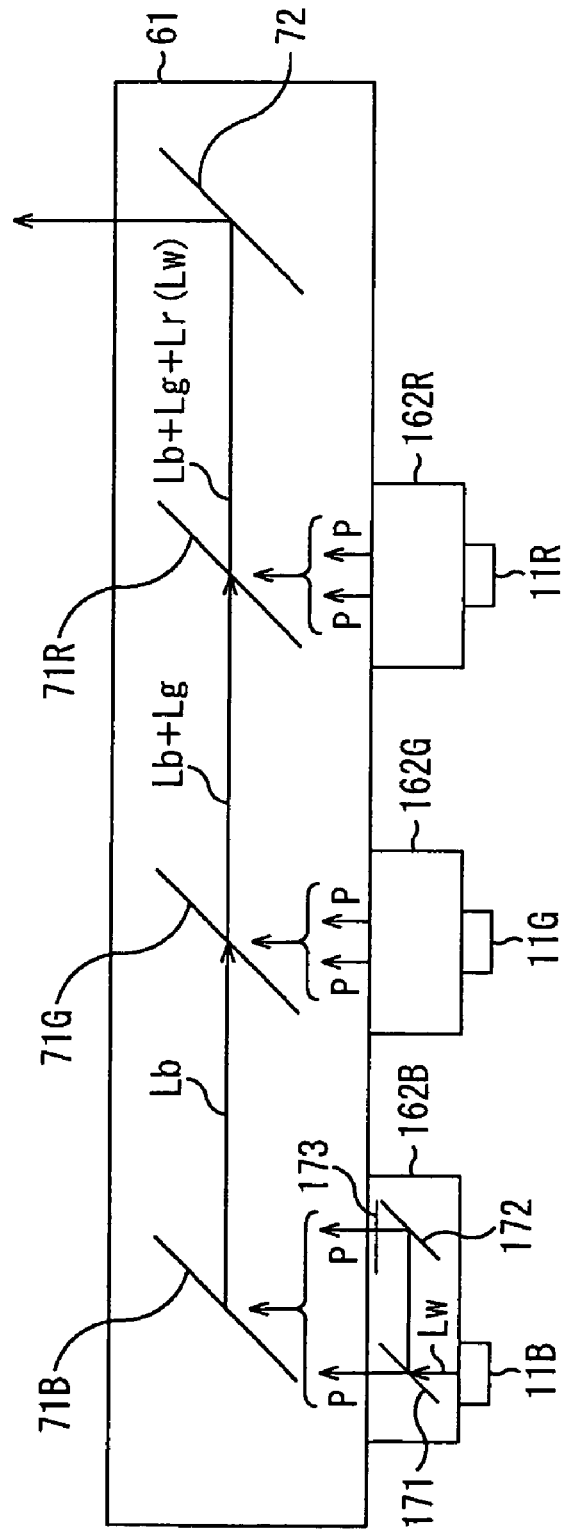
FIG. 19 is a view showing a configuration example of an optical unit of FIG. 18.

In other words, in this example, from the optical unit 61, as shown in FIG. 19, the P-component of the blue light Lb emitted from optical unit 162B and the P-component converted from the S-component of the blue light Lb, the P-component of the green light Lg emitted from the optical unit 162G and the P-component converted from the S-component of the green light Lg, and the P-component of the red light Lr emitted from the optical unit 162R and the P-component coveted from the S-components of the red light Lr are forcibly mixed, respectively, by the optical unit 61, and it is emitted toward the light guiding plate 62.

As described above, the S-component light which has not been in use is converted into the P-component light by the optical unit 162 to use, and the P-component blue light Lb, the P-component green light Lg and the P-component red light Lr are forcibly mixed by the optical unit 61, whereby color purity can be improved in the backlight apparatus having an LED device as its light source.

Figure 20:
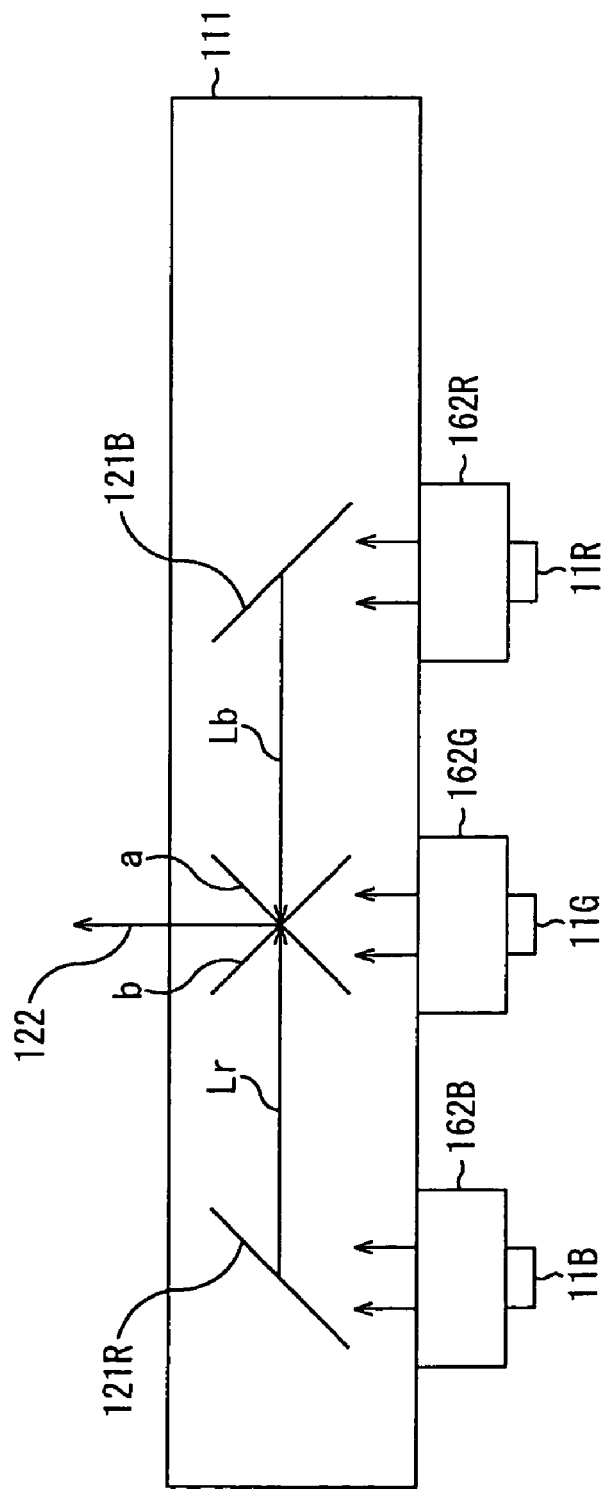
FIG. 20 is a view showing another configuration example of the optical unit of FIG. 18.

It is to be noted that, in FIG. 19, the optical unit 61 which forcibly mixes the light with the dichroic mirror 71 and the total reflection mirror 72, in place of it, as shown in FIG. 20,the optical unit 111 which forcibly mixes the light with the cross dichroic mirror 122 shown in FIG. 10 can be used.

The invention claimed is:

1. A backlight apparatus having at least an optical unit, the optical unit comprising:
    a first light source for emitting a first primary color light;
    a second light source for emitting a second primary color light;
    a third light source for emitting a third primary color light; and
    a cross dichroic device having a first dichroic film for reflecting the first primary color light and transmitting the second primary color light and a second dichroic film for reflecting the third primary color light and transmitting the second primary color light, in an X-shape, for emitting white light by mixing the first, second and third primary color light.

2. A backlight apparatus having at least an optical unit, the optical unit, comprising:
    a light source for emitting white light;
    a first mirror surface body for transmitting a first polarized wave and reflecting a second polarized wave;
    a second mirror surface body for transmitting the second polarized wave reflected by the first mirror surface body; and
    a polarization converting device for converting the second polarized wave reflected by the second mirror surface body into the first polarized wave;
    wherein a polarized wave to be emitted is emitted aligned with the first polarized wave.

3. The backlight apparatus according to claim 2, characterized in that:
    the light source is white light obtained by mixing each of primary color light emitted from a first light source for emitting a first primary color light, a second light source for emitting a second primary color light, and a third light source for emitting a third primary color light.

4. A liquid crystal display apparatus, characterized by comprising:
a backlight apparatus having at least an optical unit,
the optical unit having
a first light source for emitting a first primary color light,
a second light source for emitting a second primary color light,
a third light source for emitting a third primary color light, and
a cross dichroic device having a first dichroic film for reflecting the first primary color light and transmitting the second primary color light and a second dichroic film for reflecting the third primary color light and transmitting the second primary color light, in an X-shape, for emitting white light by mixing the first, second and third primary color light; and
a liquid crystal display panel for displaying an image by using light surface-emitted from the backlight apparatus.

5. A liquid crystal display apparatus, characterized by comprising:
a backlight apparatus having at least an optical unit,
the optical unit having
a light source for emitting white light,
a first mirror surface body for transmitting a first polarized wave and reflecting a second polarized wave,
a second mirror surface body for reflecting the second polarized wave reflected by the first mirror surface body, and
a polarization converting device for converting the second polarized wave reflected by the second mirror surface body into the first polarized wave,
wherein a polarized wave to be emitted is emitted aligned with the first polarized wave; and
a liquid crystal display panel for displaying an image by using light surface-emitted from the backlight apparatus.

* * * * *